Aug. 20, 1929. H. AMOS 1,725,609
HOISTING HOOK
Filed July 11, 1928
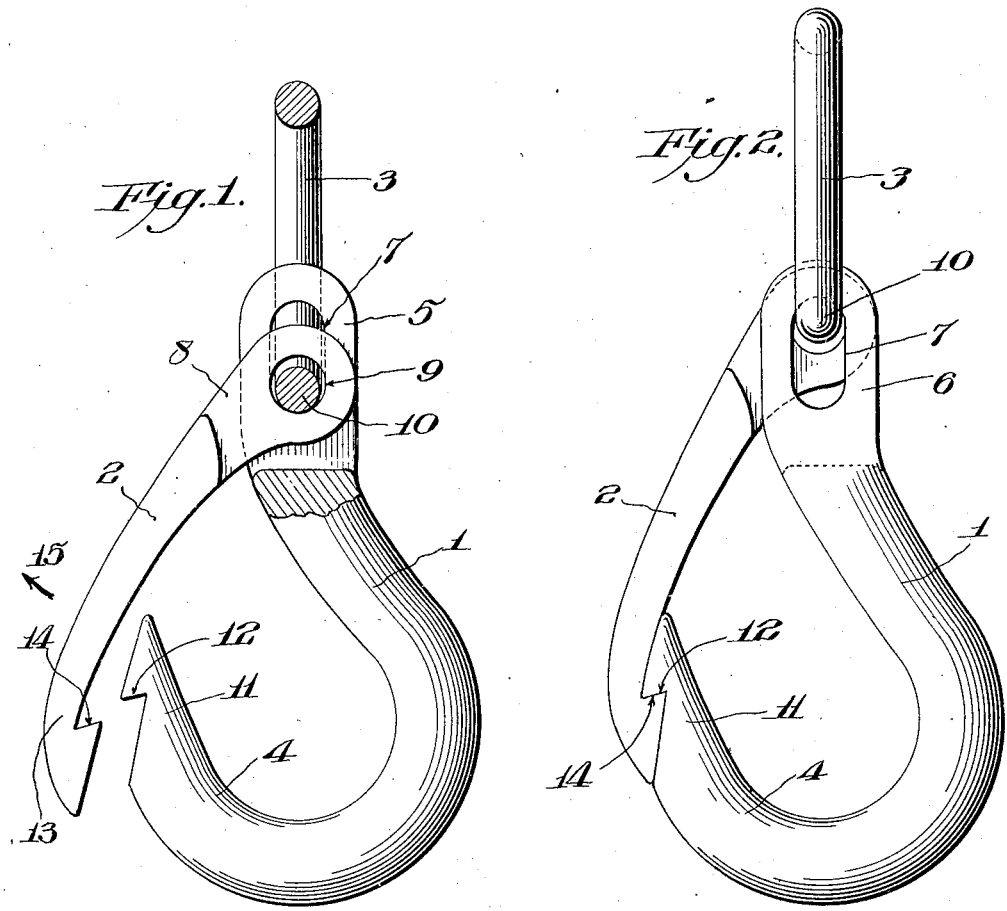
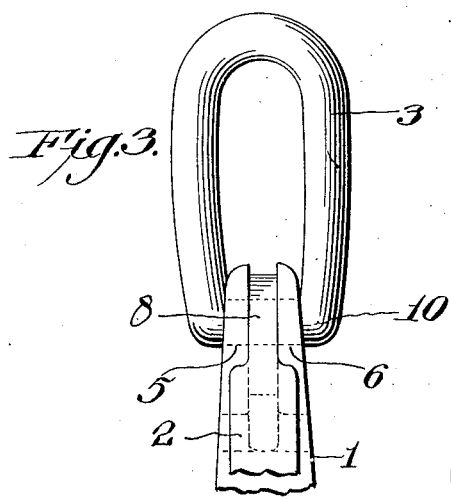
Inventor
Herman Amos,
Leonard L. Kalish
Attorney.

Patented Aug. 20, 1929.

1,725,609

UNITED STATES PATENT OFFICE.

HERMAN AMOS, OF PHILADELPHIA, PENNSYLVANIA.

HOISTING HOOK.

Application filed July 11, 1928. Serial No. 291,735.

My invention relates to a new and useful hoisting hook and it relates more particularly to a safety device for hoisting and the like, which will prevent the accidental disengagement of the suspension support from the scaffolding or object being hoisted.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

In the accompanying drawings in which like reference characters indicate like parts:

Figure 1 illustrates a side elevation, partly in section, of a hoisting hook embodying my invention, shown in the condition when the suspension support is slack.

Figure 2 represents a similar side elevation with the hook shown in the condition when the suspension support is taut.

Figure 3 represents a fragmentary end elevation of the hoisting hook embodying my invention.

The hook of my novel construction comprises primarily three parts, to wit:—the main body 1, the latch member 2 and the pivot link 3 common to the body and the latch.

The body 1 may be of any suitable shape having the lower, upturned cradle portion 4 in which a rope, cable or other suspension medium may rest. The uppermost part of the body is bifurcated as shown in Figure 3, thereby forming the two pivot flanges 5 and 6 spaced from each other a suitable distance. A vertically elongated aperture 7 is provided in the two flanges 5 and 6. The latch member 2 is narrowed at the top so as to provide a relatively narrow pivot flange 8 which is disposed between the two pivot flanges 5 and 6 of the body. The pivot flange portion 8 of the latch 2 is provided with a generally circular opening 9. The lower horizontal portion 10 of the pivot link 3 passes through the elongated opening 7 and the circular opening 9, thereby connecting the body 1 and the latch 2 of the hook in pivotal relation to each other.

The upturned end 11 of the body 1 is provided with an end cut locking shoulder 12 while the corresponding end 13 of the latch 2 is provided with a similar though opposed locking shoulder 14. The distance between the circular aperture 9 and the locking shoulder 14 of the latch is made substantially equal to the distance between the uppermost part of the elongated opening 7 and the locking shoulder 12 of the body of the hook. Thus when the suspension support connected to the link 3, is slack, the link 3 will drop down into the lowermost part of the elongated opening 7 in the body of the hook, thus lowering the latch member 2 into the position shown generally in Figure 1, in which position the locking shoulders 12 and 14 are disengaged from each other and the latch member 2 may be deflected outwardly in the direction of the arrow 15 so as to permit the engagement or disengagement of a rope or cable or the like, from the body of the hook. When, however, the suspension support connected to the link 3 is taut then the latch member 2 is raised into the position shown in Figure 2 with the locking shoulders 12 and 14 in engagement with each other, thereby preventing the opening of the latch member and preventing the disengagement of the suspension rope or cable from the hook.

I am aware that the invention may be embodied in other specific forms without departing from the spirit or essential attributes thereof and I therefore desire the present embodiment to be considered in all respects as illustrative and not restrictive, reference being had to the appended claim rather than to the foregoing description to indicate the scope of the invention.

Having thus described my invention what I claim as new and desire to secure by Letters Patent, is:—

A hoisting hook of the class described comprising a hook member having a shank that is bifurcated at its upper end, the furcation being formed with registering elongated vertical slots, the free end of the hook being formed with a locking notch in the outer side thereof, a guard member having its upper end flattened for disposition between the slotted furcations, said flattened upper end of the guard member being formed with a circular opening for registration with the aforementioned slots, a suspension link disposed through the registering slots and the circular opening in the upper end of the guard member, and a hook-shaped nose formed on the lower end of the guard member for interlocking engagement with the notch formed in the free end portion of the hook when the guard member is moved upwardly simultaneously with the upward movement of the suspension link in said slots.

In testimony whereof, I have hereunto set my hand this 31st day of May 1928.

HERMAN AMOS.